United States Patent
Malladi et al.

(10) Patent No.: US 7,257,377 B2
(45) Date of Patent: Aug. 14, 2007

(54) SYSTEMS AND METHODS FOR IMPROVING CHANNEL ESTIMATION

(75) Inventors: Durga Prasad Malladi, San Diego, CA (US); Josef Blanz, Munich (DE); Yongbin Wei, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/368,765

(22) Filed: Feb. 18, 2003

(65) Prior Publication Data

US 2004/0162030 A1 Aug. 19, 2004

(51) Int. Cl.
*H04B 15/00* (2006.01)
*H04B 17/00* (2006.01)

(52) U.S. Cl. .................. 455/65; 455/67.11; 455/67.13; 375/346

(58) Field of Classification Search .................. 455/65, 455/67.13, 67.11; 375/346
See application file for complete search history.

(56) References Cited

U.S. PATENT DOCUMENTS 5,101,501 A 3/1992 Gilhousen et al.

OTHER PUBLICATIONS

Baltersee et al, A Method and Rake Receiver for Phasor Estamation in communication System, EP001130792A1).*

* cited by examiner

*Primary Examiner*—Matthew Anderson
*Assistant Examiner*—Yuwen Pan
(74) *Attorney, Agent, or Firm*—Thomas R. Rouse; Thien T. Nguyen; Ramin Mobarhan

(57) ABSTRACT

A method for improving channel estimation in a wireless communication system is disclosed. A wireless signal that includes a plurality of multipath components is received. N channel estimates are then obtained, where N is any positive integer greater than one. Each channel estimate of the N channel estimates corresponds to a different multipath component of the plurality of multipath components. The effects of interference between the plurality of multipath components on the N channel estimates is then reduced.

19 Claims, 8 Drawing Sheets

SYSTEMS AND METHODS FOR IMPROVING CHANNEL ESTIMATION

REFERENCE TO CO-PENDING APPLICATIONS FOR PATENT

The present Application for Patent is related to the following co-pending U.S. Patent Applications:

"Communication Receiver with an Adaptive Equalizer" by Yongbin Wei, Durga Malladi, and Josef Blanz, having U.S. Ser. No. 10/368,920, filed Feb. 18, 2003, assigned to the assignee hereof, and expressly incorporated by reference herein;

"Communication Receiver with an Adaptive Equalizer Length" by Durga Malladi, Josef Blanz and Yongbin Wei, having U.S. Ser. No. 10/369,287 filed Feb. 18, 2003, assigned to the assignee hereof, and expressly incorporated by reference herein;

"Communication Receiver with an Adaptive Equalizer That Uses Channel Estimation" by Durga Malladi, Josef Blanz and Yongbin Wei, having U.S. Ser. No. 10/368,892, Feb. 18, 2003, assigned to the assignee hereof, and expressly incorporated by reference herein.

"Communication Receiver with an Adaptive Equalizer and a Rake Receiver With Channel Estimation" by Durga Malladi, Josef Blanz and Yongbin Wei, U.S. Ser. No. 10/368,892, filed Feb. 18, 2003, assigned to the assignee hereof, and expressly incorporated by reference herein.

BACKGROUND

1. Field

The present invention relates generally to channel estimation in communications systems, and more specifically, to systems and methods for improving channel estimation in wireless communication systems.

2. Background

Communications systems are used for transmission of information from one device to another. Prior to transmission, information is encoded into a format suitable for transmission over a communication channel. A wireless signal containing the encoded information is then transmitted over the communication channel. A communication receiver is used to receive the wireless signal.

Typically, the received wireless signal includes a plurality of multipath components. These multipath components are different versions of the wireless signal that are generated by reflections from structures and natural formations. The different multipath components experience degradation from noise as they travel through the communication channel. Thus, each multipath component includes a signal component that corresponds to the transmitted signal and a noise component that does not correspond to the transmitted signal.

Sometimes, a channel estimate is used in a communication receiver. Interference between the multipath components of a wireless signal may make it difficult to obtain an accurate channel estimate. A need exists, therefore, for an improved channel estimation technique in which the effects of multipath interference are minimized.

DETAILED DESCRIPTION

Figure 1:
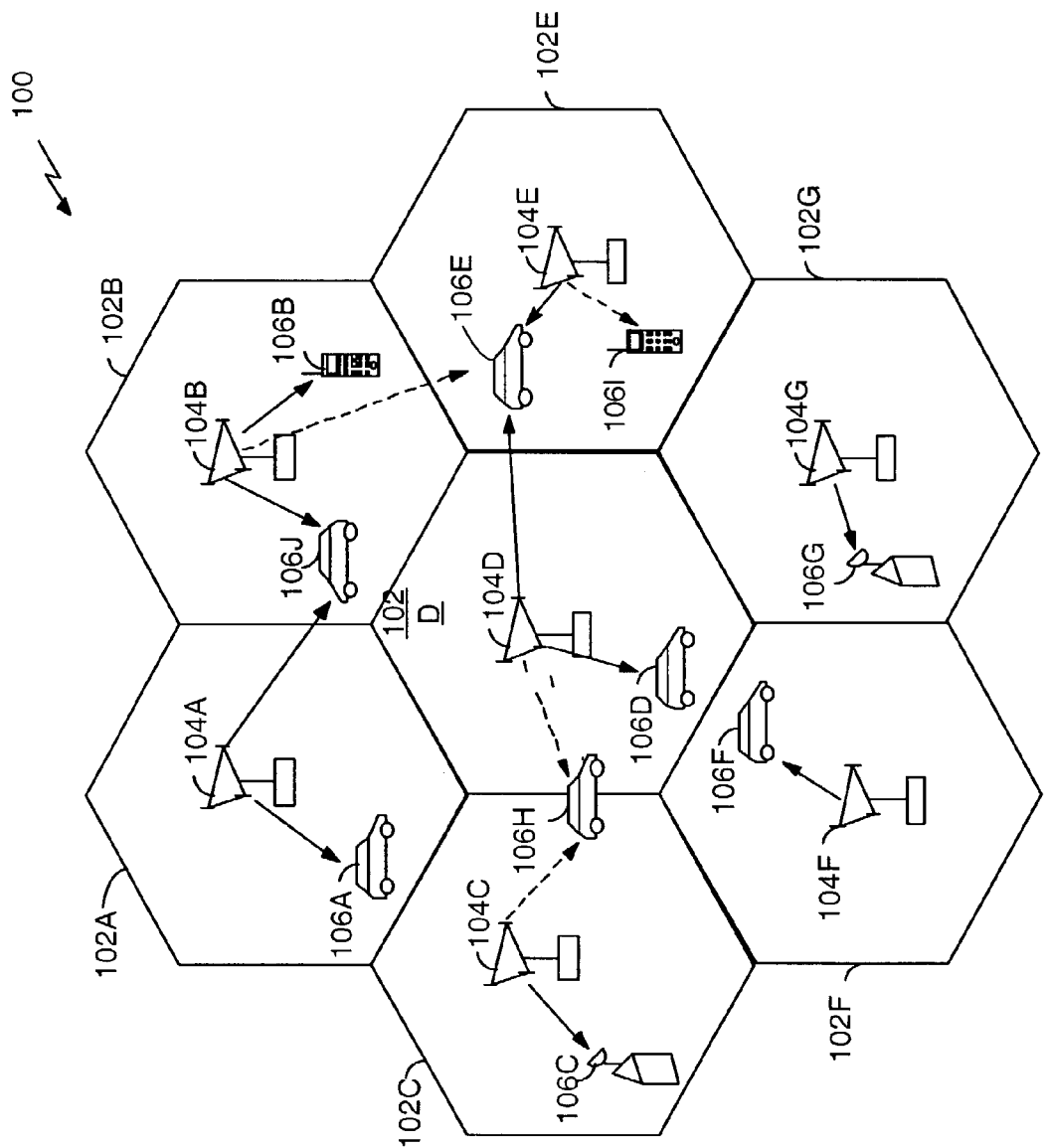
FIG. 1 is a diagram of a spread spectrum communication system that supports a number of users.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The following discussion develops the exemplary embodiments of the systems and methods for improving channel estimation by first discussing a spread-spectrum wireless communication system. A base station and a mobile station, as well as the communications sent therebetween, are then discussed. The components of an embodiment of a subscriber unit are then shown. Functional block diagrams are shown and described in relation to the transmission and reception of a wireless signal. Details regarding an enhanced channel estimator are also set forth. An exemplary method for improving channel estimation in a wireless communication system is then discussed.

Note that the exemplary embodiment is provided as an exemplar throughout this discussion; however, alternate embodiments may incorporate various aspects without departing from the scope of the present invention. Specifically, the present invention is applicable to a data processing system, a wireless communication system, a mobile IP network and any other system desiring to receive and process a wireless signal.

The exemplary embodiment employs a spread-spectrum wireless communication system. Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A system may be designed to support one or more standards such as the "TIA/EIA/IS-95-B Mobile Station-Base Station Compatibility Standard for Dual-Mode Wideband Spread Spectrum Cellular System" referred to herein as the IS-95 standard, the standard offered by a consortium named "3rd Generation Partnership Project" referred to herein as 3GPP, and embodied in a set of documents including Document Nos. 3GPP TS 25.211, 3GPP TS 25.212, 3GPP TS 25.213, and 3GPP TS 25.214, 3GPP TS 25.302, referred to herein as the W-CDMA standard, the standard offered by a consortium named "3rd Generation Partnership Project 2" referred to herein as 3GPP2, and TR-45.5 referred to herein as the cdma2000 standard, formerly called IS-2000 MC. The standards cited hereinabove are hereby expressly incorporated herein by reference.

Each standard specifically defines the processing of data for transmission from base station to mobile station, and vice versa. As an exemplary embodiment the following discussion considers a spread-spectrum communication system consistent with the cdma2000 standard of protocols. Alternate embodiments may incorporate another standard.

The systems and methods described herein may be used with high data rate communication systems. Throughout the following discussion a specific high data rate system is described for clarity. Alternate systems may be implemented that provide transmission of information at high data rates. For CDMA communications systems designed to transmit at higher data rates, such as a High Data Rate (HDR) communications system, a variable data rate request scheme may be used to communicate at the maximum data rate that the carrier-to-interference ratio (C/I) may support. The HDR communications system is typically designed to conform to one or more standards such as the "cdma2000 High Rate Packet Data Air Interface Specification," 3GPP2 C.S0024, Version 2, Oct. 27, 2000, promulgated by the consortium "3$^{rd}$ Generation Partnership Project 2." The contents of the aforementioned standard is incorporated by reference herein.

A receiver in an exemplary HDR communications system may employ a variable rate data request scheme. The receiver may be embodied in a subscriber station in communication with a land-based data network by transmitting data on an uplink to a base station (shown below). The base station receives the data and routes the data through a base station controller (BSC) (not shown) to the land-based network. Conversely, communications to the subscriber station may be routed from the land-based network to the base station via the BSC and transmitted from the base station to the subscriber unit on a downlink.

FIG. 1 serves as an example of a communications system 100 that supports a number of users and is capable of implementing at least some aspects of the embodiments discussed herein. Any of a variety of algorithms and methods may be used to schedule transmissions in system 100. System 100 provides communication for a number of cells 102A-102G, each of which is serviced by a corresponding base station 104A-104G, respectively. In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "Method and System for Providing a Soft Handoff in a CDMA Cellular Telephone System", which is assigned to the assignee of the present invention.

The downlink refers to transmission from the base station 104 to the terminal 106, and the uplink refers to transmission from the terminal 106 to the base station 104. In the exemplary embodiment, some of terminals 106 have multiple receive antennas and others have only one receive antenna. In FIG. 1, base station 104A transmits data to terminals 106A and 106J on the downlink, base station 104B transmits data to terminals 106B and 106J, base station 104C transmits data to terminal 106C, and so on.

Figure 2:
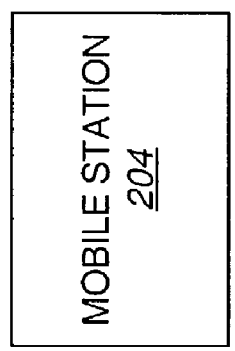
FIG. 2 is a block diagram of a base station and a mobile station in a communications system.

FIG. 2 is a block diagram of the base station 202 and mobile station 204 in a communications system 100. The base station 202 is in wireless communication with the mobile station 204. As mentioned above, the base station 202 transmits signals to mobile stations 204 that receive the signals. In addition, mobile stations 204 may also transmit signals to the base station 202.

Figure 3:
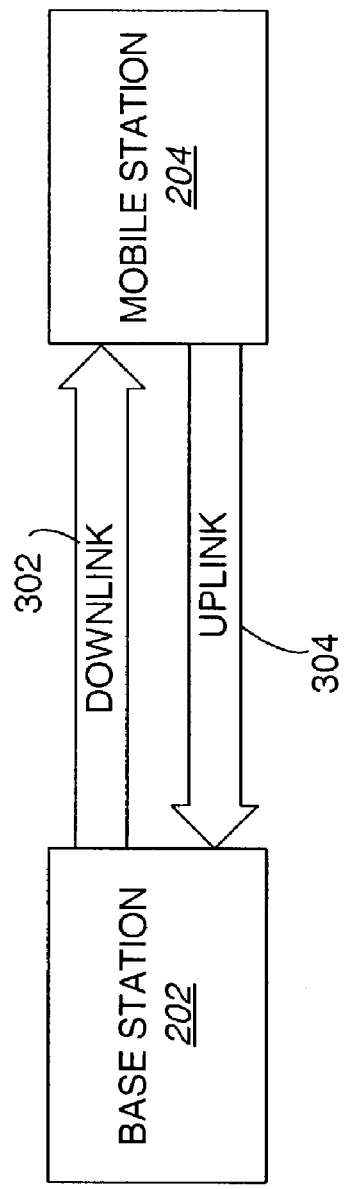
FIG. 3 is a block diagram illustrating the downlink and the uplink between the base station and the mobile station.

FIG. 3 is a block diagram of the base station 202 and mobile station 204 illustrating the downlink 302 and the uplink 304. The downlink 302 refers to transmissions from the base station 202 to the mobile station 204, and the uplink 304 refers to transmissions from the mobile station 204 to the base station 202.

Figure 4:
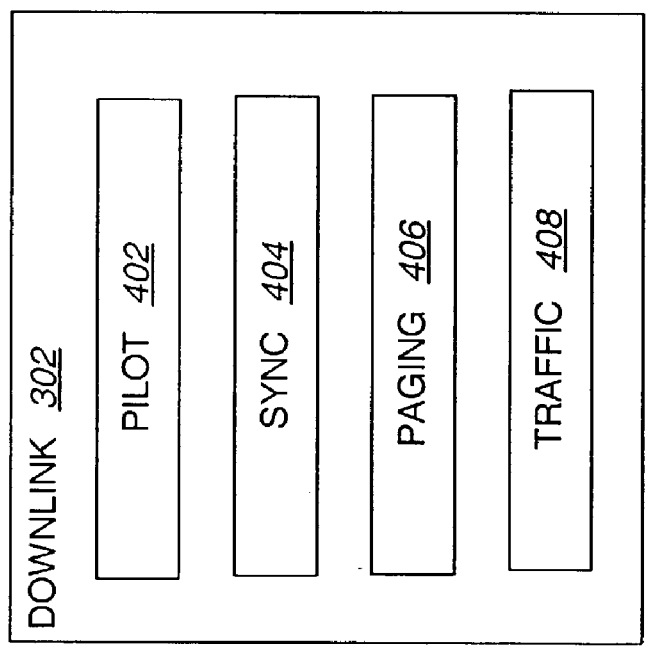
FIG. 4 is a block diagram of the channels in an embodiment of the downlink.

FIG. 4 is a block diagram of the channels in an embodiment of the downlink 302. The downlink 302 includes the pilot channel 402, the sync channel 404, the paging channel 406 and the traffic channel 408. The downlink 302 illustrated is only one possible embodiment of a downlink 302 and it will be appreciated that other channels may be added or removed from the downlink 302.

Under one CDMA standard, described in the Telecommunications Industry Association's TIA/EIA/IS-95-A Mobile Stations-Base Station Compatibility Standard for Dual-Mode Wideband Spread Spectrum Cellular System, each base station 202 transmits pilot 402, sync 404, paging 406 and forward traffic 408 channels to its users. The pilot channel 402 is an unmodulated, direct-sequence spread spectrum signal transmitted continuously by each base station 202. The pilot channel 402 allows each user to acquire the timing of the channels transmitted by the base station 202, and provides a phase reference for coherent demodulation. The pilot channel 402 also provides a means for signal strength comparisons between base stations 202 to determine when to hand off between base stations 202 (such as when moving between cells 102).

The sync channel 404 conveys timing and system configuration information to the mobile station 204. The paging channel 406 is used to communicate with mobile stations 204 when they are not assigned to a traffic channel 408. The paging channel 406 is used to convey pages, that is, notifications of incoming calls, to the mobile stations 204. The traffic channel 408 is used to transmit user data and voice. Signaling messages are also sent over the traffic channel 408.

Figure 5:
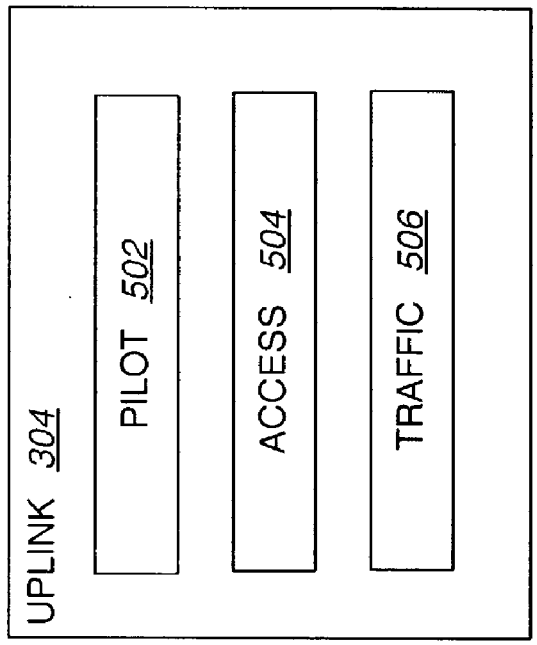
FIG. 5 is a block diagram of the channels in an embodiment of the uplink.

FIG. 5 is a block diagram of the channels in an embodiment of the uplink 304. The uplink 304 may include a pilot channel 502, an access channel 504 and a traffic channel 506. The uplink 304 illustrated is only one possible embodiment of an uplink and it will be appreciated that other channels may be added or removed from the uplink 304.

The uplink 304 of FIG. 5 includes a pilot channel 502. Recall that third-generation (3G) wireless radiotelephone communication systems have been proposed in which an uplink 304 pilot channel 502 is used. For example, in the currently proposed cdma2000 standard, the mobile station 204 transmits a Reverse Link Pilot Channel (R-PICH) that the base station 202 uses for initial acquisition, time tracking, rake-receiver coherent reference recovery, and power control measurements. Thus, systems and methods herein are applicable to pilot signals on the downlink 302 and on the uplink 304.

The access channel 504 is used by the mobile station 204 to communicate with the base station 202 when the mobile 204 does not have a traffic channel 506 assigned. The uplink traffic channel 506 is used to transmit user data and voice. Signaling messages are also sent over the uplink traffic channel 506.

Figure 6:
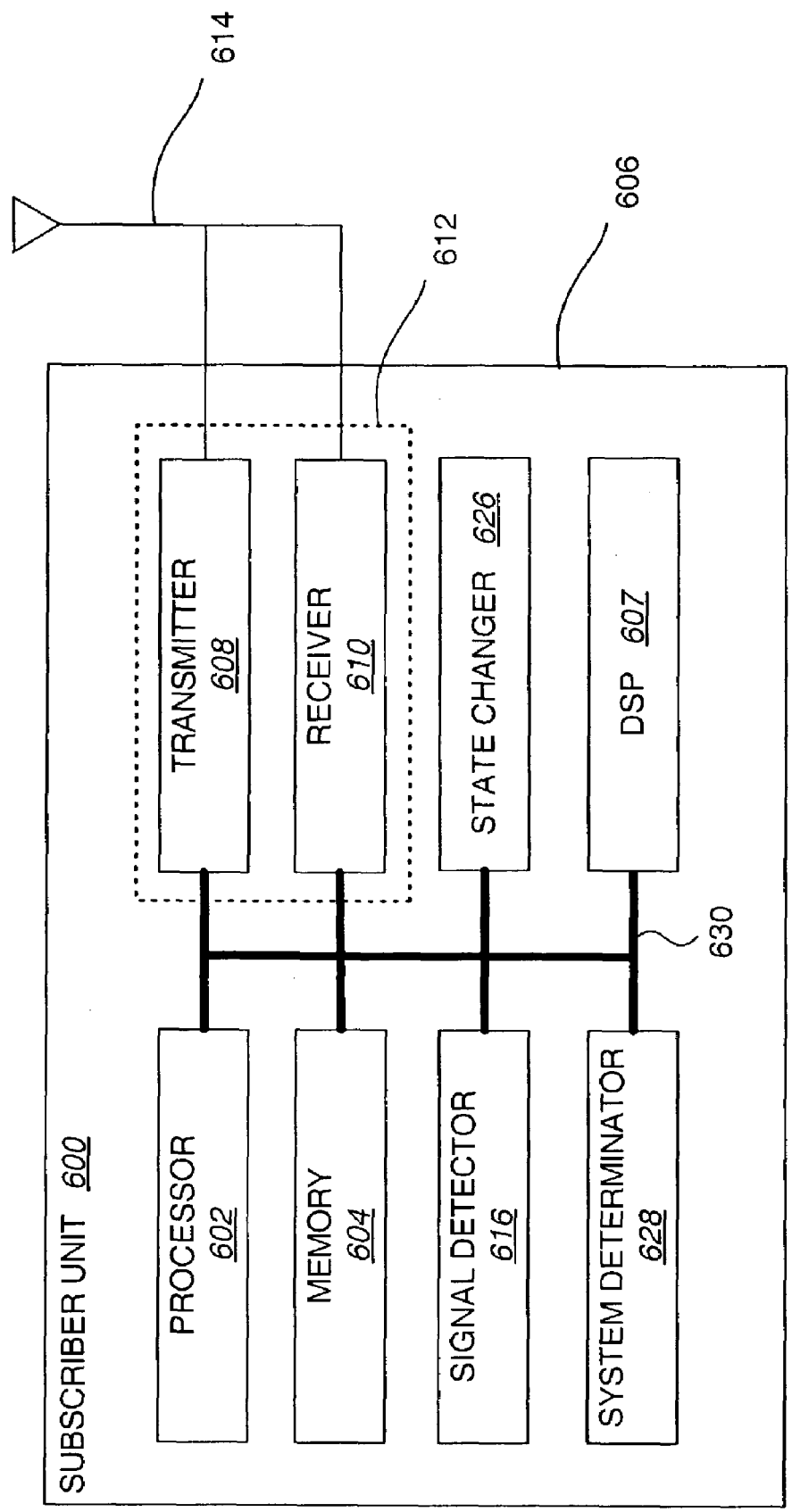
FIG. 6 is a block diagram of an embodiment of a subscriber unit.

An embodiment of a mobile station 204 is shown in a subscriber unit system 600 illustrated in the functional block diagram of FIG. 6. The system 600 includes a processor 602 which controls operation of the system 600. The processor 602 may also be referred to as a CPU. Memory 604, which may include both read-only memory (ROM) and random access memory (RAM), provides instructions and data to the processor 602. A portion of the memory 604 may also include non-volatile random access memory (NVRAM).

The system 600, which is typically embodied in a wireless communication device such as a cellular telephone, also includes a housing 606 that contains a transmitter 608 and a receiver 610 to allow transmission and reception of data, such as audio communications, between the system 600 and a remote location, such as a cell site controller or base station 202. The transmitter 608 and receiver 610 may be combined into a transceiver 612. An antenna 614 is attached to the housing 606 and electrically coupled to the transceiver 612. Additional antennas (not shown) may also be used. The operation of the transmitter 608, receiver 610 and antenna 614 is well known in the art and need not be described herein.

The system 600 also includes a signal detector 616 used to detect and quantify the level of signals received by the transceiver 612. The signal detector 616 detects such signals as total energy, pilot energy per pseudonoise (PN) chips, power spectral density, and other signals, as is known in the art.

A state changer 626 of the system 600 controls the state of the wireless communication device based on a current state and additional signals received by the transceiver 612 and detected by the signal detector 616. The wireless communication device is capable of operating in any one of a number of states.

The system 600 also includes a system determinator 628 used to control the wireless communication device and determine which service provider system the wireless communication device should transfer to when it determines the current service provider system is inadequate.

The various components of the system 600 are coupled together by a bus system 630 which may include a power bus, a control signal bus, and a status signal bus in addition to a data bus. However, for the sake of clarity, the various busses are illustrated in FIG. 6 as the bus system 630. The system 600 may also include a digital signal processor (DSP) 607 for use in processing signals. One skilled in the art will appreciate that the system 600 illustrated in FIG. 6 is a functional block diagram rather than a listing of specific components.

The methods disclosed herein may be implemented in an embodiment of a subscriber unit 600. The disclosed systems and methods may also be implemented in other communication systems with a receiver, such as a base station 202. If a base station 202 is being used to implement the disclosed systems and methods, the functional block diagram of FIG. 6 may also be used to describe components in a functional block diagram of a base station 202.

Figure 7:
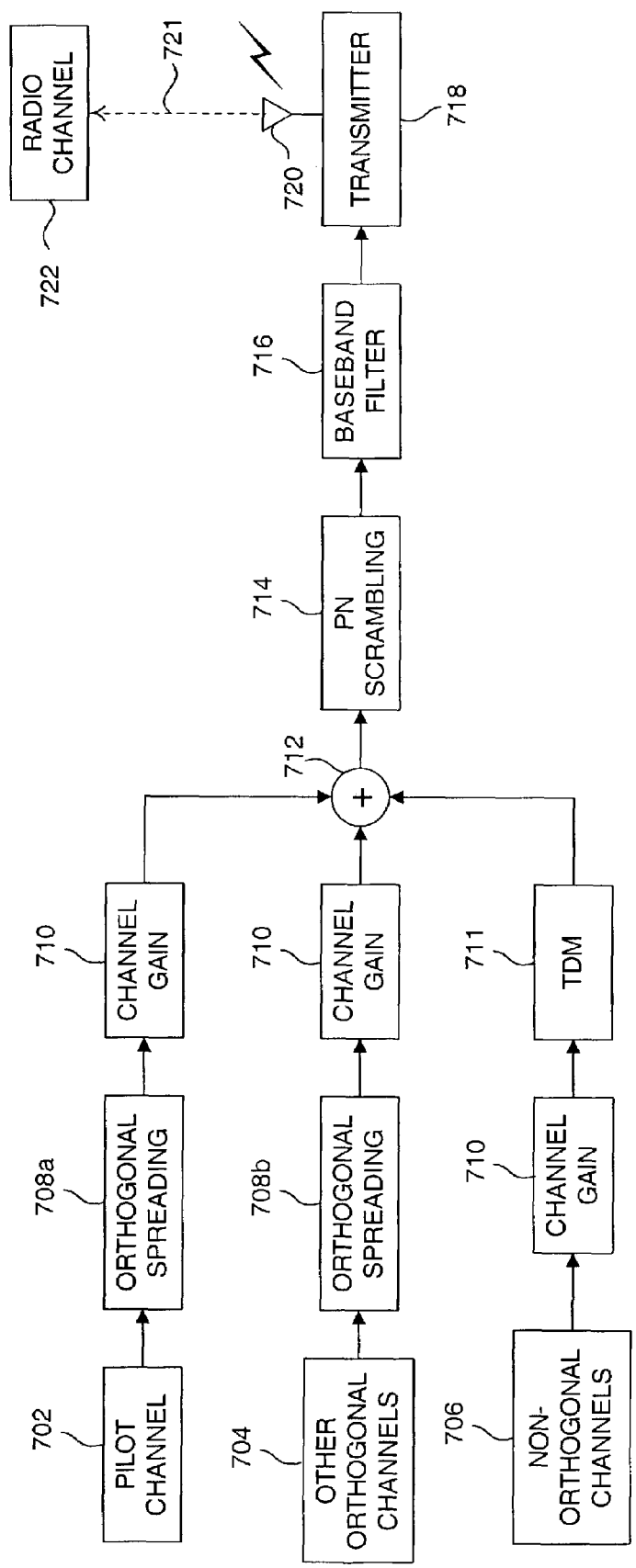
FIG. 7 is a functional block diagram illustrating the transmission of a wireless signal.

FIG. 7 is a functional block diagram illustrating the transmission of a wireless signal. The functional block diagram of FIG. 7 may be implemented in various components, such as the base station 202 and the mobile station 204.

As shown, the wireless signal includes a pilot channel 702 and other orthogonal channels 704. Additional non-orthogonal channels 706 may also be included in the wireless signal. Examples of non-orthogonal channels include the synchronization channel (SCH), channels scrambled by the secondary scrambling code (SSC) in WCDMA, and channels spread by quasi-orthogonal sequences (QOS) in cdma2000.

The orthogonal channels are provided to an orthogonal spreading component 708. Both the orthogonal and non-orthogonal channels are then provided to a channel gain component 710, which adds a gain for the channel. The outputs from the channel gain components 710 are summed together as shown by the summer 712. As shown in FIG. 7, the non-orthogonal channels may be time-division multiplexed (TDM) 711. In other embodiments, one or more of the orthogonal channels may be time-division multiplexed.

The non-orthogonal channels 706 do not have orthogonal spreading components. Some non-orthogonal channels 706 (e.g., the synchronization channel) may be fed directly into a channel gain component 710. Other non-orthogonal channels 706 (e.g., channels spread by quasi-orthogonal sequences in cdma2000) are spread in a non-orthogonal way and then fed into a channel gain component 710. The outputs of the channel gain components 710 are summed with the summer 712.

The summed signal is fed into the pseudorandom noise (PN) scrambling component 714. A baseband filter 716 takes the output from the PN scrambling component 714 and provides the filtered output 716 to a transmitter 718. The transmitter 718 includes an antenna 720. The transmitted signal 721 then enters the radio channel 722.

Figure 8:
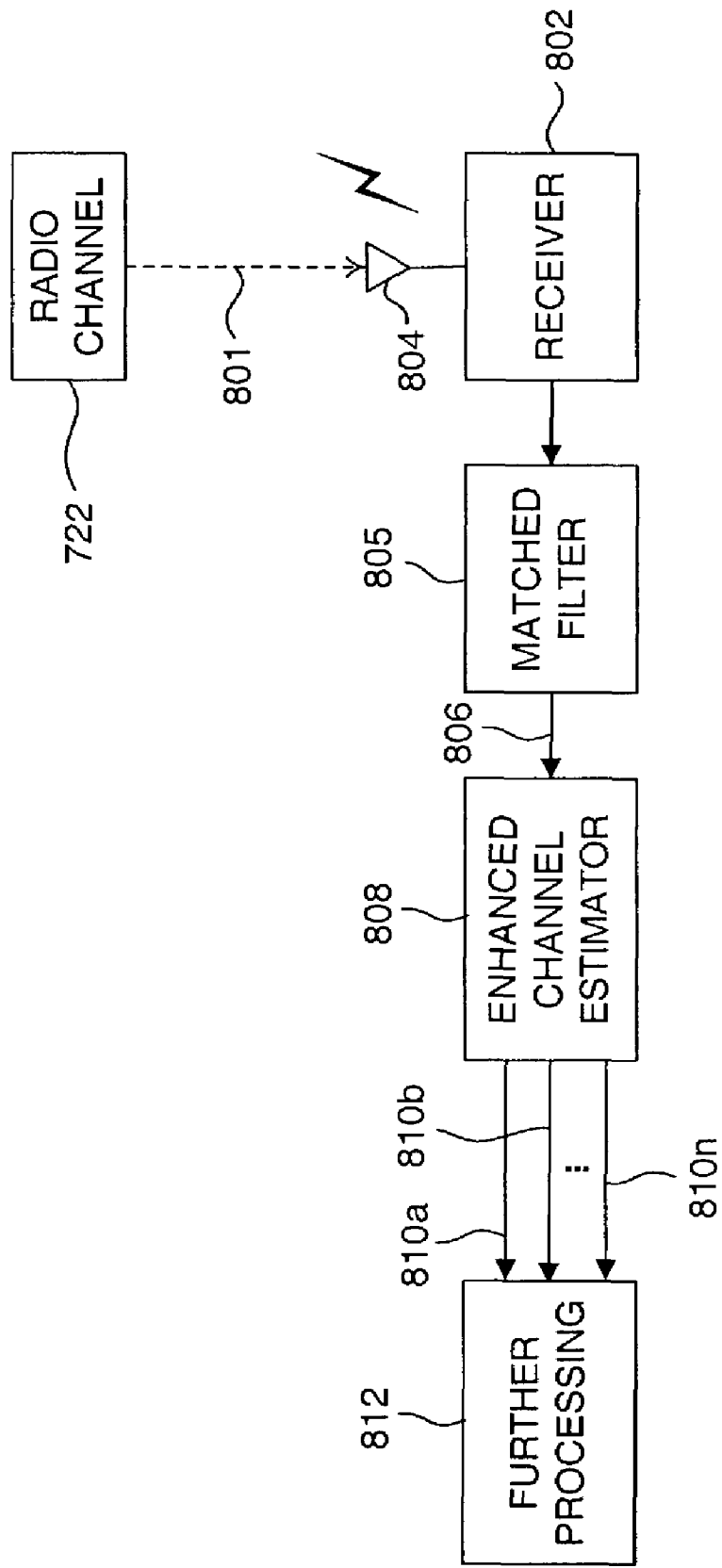
FIG. 8 is a functional block diagram illustrating the reception of a wireless signal.

FIG. 8 is a functional block diagram illustrating the reception of a wireless signal 801. A receiver 802 receives the wireless signal 801 through the use of an antenna 804. The received wireless signal 801 includes a plurality of multipath components. Each multipath component includes a signal component that corresponds to the transmitted signal 721 and a noise component that does not correspond to the transmitted signal 721.

The received wireless signal 801 is provided to a matched filter 805 that is matched to the impulse response of the baseband filter 716. The output 806 of the matched filter 805 is provided to an enhanced channel estimator 808. The enhanced channel estimator 808 calculates a plurality of enhanced channel estimates 810. Each of the enhanced channel estimates 810 corresponds to a different multipath component within the received wireless signal 801. The enhanced channel estimates 810 are enhanced with respect to channel estimates calculated using known techniques. In particular, the enhanced channel estimates 810 are calculated so as to minimize the effects of interference between the plurality of multipath components (multipath interference). An embodiment of the enhanced channel estimator 808 will be described below.

The enhanced channel estimates 810 are then provided to a further processing component 812 for further processing. In one embodiment, the enhanced channel estimates 810 are used in an equalizer. In another embodiment, the enhanced channel estimates 810 are used in a rake receiver.

Figure 9:
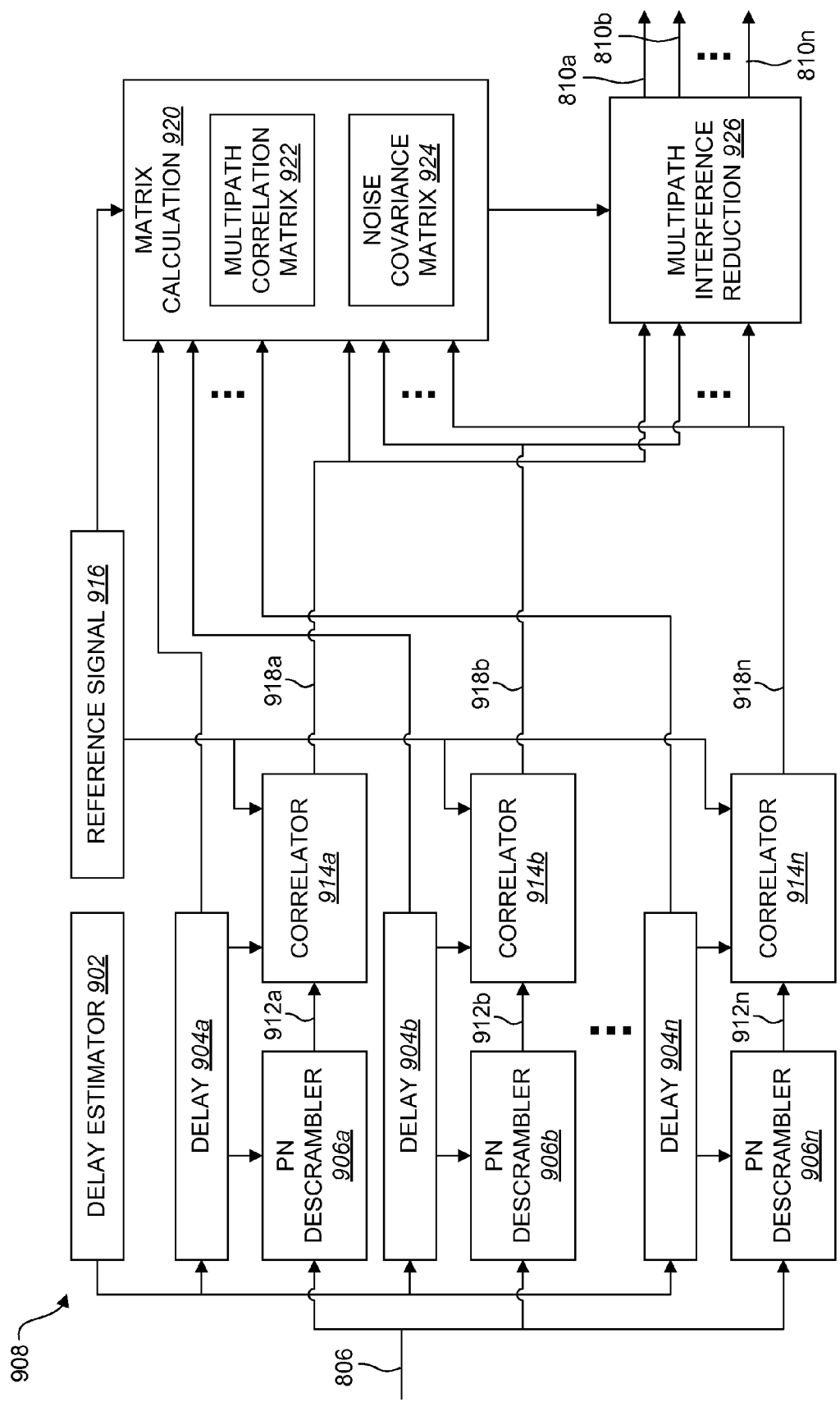
FIG. 9 is a functional block diagram of an embodiment of the enhanced channel estimator.

FIG. 9 is a block diagram illustrating logical components within an embodiment of the enhanced channel estimator 908. The enhanced channel estimator 908 includes a delay estimator 902. The delay estimator 902 estimates N delays 904, where N is any positive integer greater than one. Each of the N delays 904 corresponds to a different multipath component within the received wireless signal 801.

As described above, the systems and methods disclosed herein may be implemented in a wireless communication system that utilizes CDMA techniques. In such a wireless communication system, each multipath component within the received wireless signal 801 includes a plurality of chips. Each chip spans a certain time duration defined by the chip rate. In some embodiments, at least some of the multipath components within the received wireless signal 801 are separated from one another by less than the chip duration. In such embodiments, at least some of the N delays 904 are also separated from one another by less than the chip duration.

The enhanced channel estimator 908 also includes N PN descramblers 906 that perform PN descrambling on the output 806 of the matched filter 805. Thus, PN descrambling is performed N times on the output 806 of the matched filter 805, and N descrambled signals 912 are obtained. Each PN descrambler 906 aligns the signal and the descrambling sequence based on the delay 904 prior to conducting descrambling.

The enhanced channel estimator 808 also includes a plurality of correlators 914 that correlate one of the N descrambled signals 912 with a reference signal 916 to obtain a channel estimate 918. As shown, N channel estimates 918 are obtained. Each channel estimate 918 corresponds to a different multipath component within the received wireless signal 801. In one embodiment, the reference signal 916 only includes the pilot channel 402. In another embodiment, the reference signal 916 includes the pilot channel 402 and the traffic channel 408. In another embodiment, the reference signal 916 includes the pilot channel 402, the traffic channel 408, and an estimate of a ratio between the traffic channel 408 and the pilot channel 402.

The enhanced channel estimator 808 also includes a matrix calculation component 920. The matrix calculation component 920 calculates a multipath correlation matrix 922 and a noise covariance matrix 924. As mentioned previously, the received wireless signal 801 includes a plurality of multipath components. The multipath correlation matrix 922 includes information about how signal components within the plurality of multipath components are correlated with one another. The noise covariance matrix 924 includes information about how noise components within the plurality of multipath components are correlated with one another. The N delays 904, the N channel estimates 918, and the reference signal 916 are used to calculate both the multipath correlation matrix 922 and the noise covariance matrix 924.

The enhanced channel estimator 808 also includes a multipath interference reduction component 926. As mentioned previously, the multipath components in the received wireless signal 801 may interfere with one another. The multipath reduction component 926 uses the multipath correlation matrix 922 and the noise covariance matrix 924 to reduce the effects of this multipath interference on the N channel estimates 918. Thus, N enhanced channel estimates 810 are obtained.

Referring to FIGS. 7 through 9, the following provides a mathematical description and background of various mathematical formulas that may be used.

The channel estimates 918 may be written as shown in Formula 1. The parameter $\rho$ in Formula 1 is the baseband filter 716 auto-correlation function.

$$y[m] = \sum_{i=0}^{P-1} \alpha_i \cdot \rho[m-i] + v[m]. \qquad \text{Formula 1}$$

In matrix notation, the channel estimates 918 may be written as shown in Formula 2. The parameter A in Formula 2 is the multipath correlation matrix 922. The parameter $\alpha$ in Formula 2 is a fading coefficient vector. The parameter v in Formula 2 is a noise vector.

$$y = A \cdot \alpha + v \qquad \text{Formula 2.}$$

In one embodiment, reducing the effects of multipath interference on the N channel estimates 918 involves calculating an estimate of the fading coefficient vector. This calculation may be performed by the multipath interference reduction component 926. An estimate of the fading coefficient vector may be written as shown in Formula 3. The parameter A in Formula 3 is the multipath correlation matrix 922. The parameter $\Lambda$ in Formula 3 is the noise covariance matrix 924.

$$\beta = [A^H \cdot \Lambda^{-1} \cdot A]^{-1} \cdot A^H \cdot \Lambda^{-1} \cdot y \qquad \text{Formula 3.}$$

Figure 10:
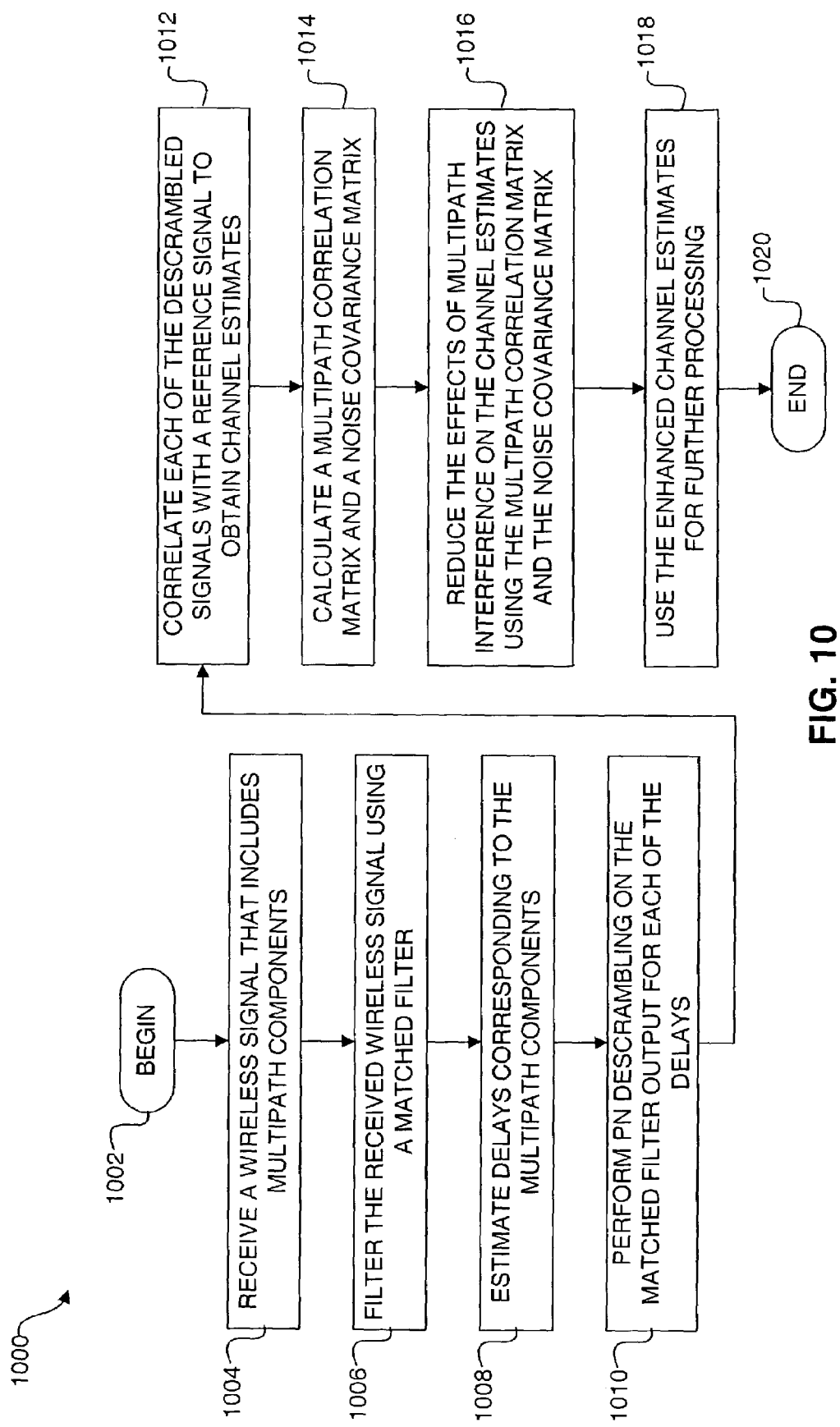
FIG. 10 is a flow diagram illustrating an embodiment of a method for improving channel estimation in a wireless communication system.

FIG. 10 is a flow diagram of a method 1000 for improving channel estimation in a wireless communication system. The method 1000 begins 1002 when a wireless signal 801 is received 1004. As mentioned previously, the wireless signal 801 includes a plurality of multipath components. Each multipath component includes a signal component that corresponds to the transmitted signal 721 and a noise component that does not correspond to the transmitted signal 721.

The received wireless signal 801 is then filtered 1006 using a matched filter 805 that is matched to the impulse response of the baseband filter 716. The method 1000 then involves estimating 1008 N delays 904, where N is any positive integer. Each of the N delays 904 corresponds to a different multipath component within the received wireless signal 801. PN descrambling is then performed 1010 N times on the output 806 of the matched filter 805, once after each of the different delays 904 estimated in step 1008. Thus, N descrambled signals 912 are obtained.

Each of the N descrambled signals 912 is then correlated 1012 with a reference signal 916 to obtain N channel estimates 918. Each of the N channel estimates 918 corresponds to a different multipath component within the received signal 801.

The method 1000 then involves calculating 1014 a multipath correlation matrix 922 and a noise covariance matrix 924. As mentioned previously, the multipath correlation matrix 922 includes information about how signal components within the plurality of multipath components are correlated with one another. The noise covariance matrix 924 includes information about how noise components within the plurality of multipath components are correlated with one another. The N delays 904, the N channel estimates 918, and the reference signal 916 are used to calculate the multipath correlation matrix 922 and the noise covariance matrix 924.

As mentioned previously, the multipath components in the received wireless signal 801 may interfere with one another. The multipath correlation matrix 922 and the noise covariance matrix 924 are then used to reduce 1016 the effects of this multipath interference on the N channel estimates 918. Thus, N enhanced channel estimates 810 are obtained. The N enhanced channel estimates 810 may be used for further processing 1018, and the method 1000 may then end 1020.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for improving channel estimation in a wireless communication system, comprising:
   receiving a wireless signal that comprises a plurality of multipath components;
   obtaining N channel estimates, wherein N is any positive integer greater than one, wherein each channel estimate of the N channel estimates corresponds to a different multipath component of the plurality of multipath components, and wherein obtaining N channel estimates comprises:
      filtering the received wireless signal using a matched filter that is matched to an impulse response of a baseband filter;
      estimating N delays, wherein each of the N delays corresponds to a different multipath component of the plurality of multipath components;
      performing PN descrambling on the output of the matched filter N times, once after each of the N delays, thereby obtaining N descrambled signals; and
      correlating each of the N descrambled signals with a reference signal to obtain N channel estimates, wherein each of the N channel estimates corresponds to a different multipath component of the plurality of multipath components;
   calculating a multipath correlation matrix which comprises information about how signal components within N of the plurality of multipath components are correlated with one another;
   calculating a noise covariance matrix which comprises information about how noise components within N of the plurality of multipath components are correlated with one another, wherein the multipath correlation matrix and the noise covariance matrix are used to reduce the effects of interference between the plurality of multipath components on the N channel estimates; and
   reducing the effects of interference between the plurality of multipath components on the N channel estimates.

2. The method as defined in claim 1, wherein the N delays, the N channel estimates, and the reference signal are used to calculate the multipath correlation matrix and the noise covariance matrix.

3. The method as defined in claim 1, wherein the wireless communication system utilizes code division multiple access techniques.

4. The method as defined in claim 3, wherein each multipath component within the plurality of multipath components comprises a plurality of chips, each chip having a chip duration, and wherein at least some of the plurality of multipath components are separated from one another by less than the chip duration.

5. The method as defined in claim 1, wherein the method is implemented by a mobile station.

6. The method as defined in claim 1, wherein the method is implemented by a base station.

7. A mobile station for use in a wireless communication system, the mobile station comprising:
- at least one antenna for receiving a wireless signal that comprises a plurality of multipath components;
- a receiver in electronic communication with the at least one antenna; and
- an enhanced channel estimator that implements a method comprising:
- obtaining N channel estimates, wherein N is any positive integer greater than one, wherein each channel estimate of the N channel estimates corresponds to a different multipath component of the plurality of multipath components, and wherein obtaining N channel estimates comprises:
  - filtering the received wireless signal using a matched filter that is matched to an impulse response of a baseband filter;
  - estimating N delays, wherein each of the N delays corresponds to a different multipath component of the plurality of multipath components;
  - performing PN descrambling on the output of the matched filter N times, once after each of the N delays, thereby obtaining N descrambled signals; and
  - correlating each of the N descrambled signals with a reference signal to obtain N channel estimates, wherein each of the N channel estimates corresponds to a different multipath component of the plurality of multipath components;
- calculating a multipath correlation matrix which comprises information about how signal components within N of the plurality of multipath components are correlated with one another;
- calculating a noise covariance matrix which comprises information about how noise components within N of the plurality of multipath components are correlated with one another, wherein the multipath correlation matrix and the noise covariance matrix are used to reduce the effects of interference between the plurality of multipath components on the N channel estimates; and
- reducing the effects of interference between the plurality of multipath components on the N channel estimates.

8. The mobile station as defined in claim 7, wherein the N delays, the N channel estimates, and the reference signal are used to calculate the multipath correlation matrix and the noise covariance matrix.

9. The mobile station as defined in claim 7, wherein the wireless communication system utilizes code division multiple access techniques.

10. The mobile station as defined in claim 9, wherein each multipath component within the plurality of multipath components comprises a plurality of chips, each chip having a chip duration, and wherein at least some of the plurality of multipath components are separated from one another by less than the chip duration.

11. An apparatus for use in a wireless communication system, the mobile station comprising:
- at least one antenna for receiving a wireless signal that comprises a plurality of multipath components;
- a receiver in electronic communication with the at least one antenna; and
- an enhanced channel estimator that implements a method comprising:
- obtaining N channel estimates, wherein N is any positive integer greater than one, wherein each channel estimate of the N channel estimates corresponds to a different multipath component of the plurality of multipath components, and wherein obtaining N channel estimates comprises:
  - filtering the received wireless signal using a matched filter that is matched to an impulse response of a baseband filter;
  - estimating N delays, wherein each of the N delays corresponds to a different multipath component of the plurality of multipath components;
  - performing PN descrambling on the output of the matched filter N times, once after each of the N delays, thereby obtaining N descrambled signals; and
  - correlating each of the N descrambled signals with a reference signal to obtain N channel estimates, wherein each of the N channel estimates corresponds to a different multipath component of the plurality of multipath components;
- calculating a multipath correlation matrix which comprises information about how signal components within N of the plurality of multipath components are correlated with one another;
- calculating a noise covariance matrix which comprises information about how noise components within N of the plurality of multipath components are correlated with one another, wherein the multipath correlation matrix and the noise covariance matrix are used to reduce the effects of interference between the plurality of multipath components on the N channel estimates; and
- reducing the effects of interference between the plurality of multipath components on the N channel estimates.

12. The apparatus as defined in claim 11, wherein the N delays, the N channel estimates, and the reference signal are used to calculate the multipath correlation matrix and the noise covariance matrix.

13. The apparatus as defined in claim 11, wherein the wireless communication system utilizes code division multiple access techniques.

14. The apparatus as defined in claim 11, wherein each multipath component within the plurality of multipath components comprises a plurality of chips, each chip having a chip duration, and wherein at least some of the plurality of multipath components are separated from one another by less than the chip duration.

15. The apparatus as defined in claim 11, wherein the apparatus comprises a mobile station.

16. The apparatus as defined in claim 11, wherein the apparatus comprises a base station.

17. A mobile station for use in a wireless communication system, the mobile station comprising:
- means for receiving a wireless signal that comprises a plurality of multipath components;
- means for obtaining N channel estimates, wherein N is any positive integer greater than one, wherein each channel estimate of the N channel estimates corresponds to a different multipath component of the plurality of multipath components, and wherein means for obtaining N channel estimates comprises:
  - means for filtering the received wireless signal using a matched filter that is matched to an impulse response of a baseband filter;
  - means for estimating N delays, wherein each of the N delays corresponds to a different multipath component of the plurality of multipath components;

means for performing PN descrambling on the output of the matched filter N times, once after each of the N delays, thereby obtaining N descrambled signals; and means for correlating each of the N descrambled signals with a reference signal to obtain N channel estimates, wherein each of the N channel estimates corresponds to a different multipath component of the plurality of multipath components;

means for calculating a multipath correlation matrix which comprises information about how signal components within N of the plurality of multipath components are correlated with one another means for calculating a noise covariance matrix which comprises information about how noise components within N of the plurality of multipath components are correlated with one another, wherein the multipath correlation matrix and the noise covariance matrix are used to reduce the effects of interference between the plurality of multipath components on the N channel estimates; and means for reducing the effects of interference between the plurality of multipath components on the N channel estimates.

18. The mobile station as defined in claim 17, wherein the wireless communication system utilizes code division multiple access techniques.

19. The mobile station as defined in claim 18, wherein each multipath component within the plurality of multipath components comprises a plurality of chips, each chip having a chip duration, and wherein at least some of the plurality of multipath components are separated from one another by less than the chip duration.

* * * * *